(12) United States Patent
Papke

(10) Patent No.: US 8,991,756 B2
(45) Date of Patent: Mar. 31, 2015

(54) SMALL DIAMETER PRESSURE STRUCTURE COMMERCIAL AIRCRAFT CREW REST

(75) Inventor: Robert Papke, Camano Island, WA (US)

(73) Assignee: BE Intellectual Property, Inc., Wellington, FL (US)

(*) Notice: Subject to any disclaimer, the term of this patent is extended or adjusted under 35 U.S.C. 154(b) by 616 days.

(21) Appl. No.: 12/964,059

(22) Filed: Dec. 9, 2010

(65) Prior Publication Data

US 2011/0233333 A1   Sep. 29, 2011

Related U.S. Application Data

(60) Provisional application No. 61/286,344, filed on Dec. 14, 2009.

(51) Int. Cl.
*B64D 11/00* (2006.01)

(52) U.S. Cl.
CPC ........ *B64D 11/00* (2013.01); *B64D 2011/0076* (2013.01); *Y02T 50/46* (2013.01)
USPC ..................................... 244/118.6; 244/118.5

(58) Field of Classification Search
USPC ............ 244/118.5, 118.6; 105/314, 315, 316; 114/189, 192, 193
See application file for complete search history.

(56) References Cited

U.S. PATENT DOCUMENTS

| 2,589,894 | A | | 11/1948 | Eyck | |
|---|---|---|---|---|---|
| 2,550,426 | A | * | 4/1951 | Phillips | 5/8 |
| 3,784,989 | A | * | 1/1974 | LeGrand | 244/118.6 |
| 4,066,227 | A | * | 1/1978 | Buchsel | 244/118.6 |
| 6,003,813 | A | | 12/1999 | Wentland et al. | |
| 6,073,883 | A | * | 6/2000 | Ohlmann et al. | 244/118.5 |
| 6,182,926 | B1 | | 2/2001 | Moore | |
| 6,305,645 | B1 | | 10/2001 | Moore | |
| 6,520,451 | B1 | | 2/2003 | Moore | |
| 6,848,654 | B1 | * | 2/2005 | Mills et al. | 244/118.5 |
| 6,932,298 | B1 | * | 8/2005 | Mills | 244/118.5 |
| 7,290,735 | B2 | * | 11/2007 | Saint-Jalmes et al. | 244/118.6 |
| 7,354,018 | B2 | * | 4/2008 | Saint-Jalmes | 244/118.5 |
| 2003/0218095 | A1 | * | 11/2003 | Saint Jalmes | 244/118.5 |

(Continued)

FOREIGN PATENT DOCUMENTS

DE   102007035681 A1   2/2009
EP      0901962 A2     3/1999

(Continued)

OTHER PUBLICATIONS

EPO, International Search Report for PCT International Patent No. PCT/US2010/059960, dated Jun. 28, 2011.

*Primary Examiner* — Tien Dinh
*Assistant Examiner* — Richard R Green
(74) *Attorney, Agent, or Firm* — Fulwider Patton LLP

(57) ABSTRACT

An aircraft crew rest station includes an overhead crew rest portion including a central deck portion, forward and aft bunk portions, and a central entry vestibule connected between a passenger seating area and the central deck portion. The forward and aft bunk portions include a plurality of adjacent partitioned individual sleeping berths configured in interfitting alternating trapezoid shapes to optimize spatial accommodation of body proportions of crew members in the available aircraft space. The central deck portion includes an emergency escape hatch, a fold-down jump seat, and a fold-down entry door that removably covers a stairway of the central entry vestibule.

10 Claims, 11 Drawing Sheets

(56) References Cited

U.S. PATENT DOCUMENTS

| | | | |
|---|---|---|---|
| 2009/0050738 A1* | 2/2009 | Breuer et al. | 244/118.5 |
| 2010/0019087 A1* | 1/2010 | Warner et al. | 244/118.6 |
| 2010/0140400 A1* | 6/2010 | Helfrich et al. | 244/118.6 |
| 2010/0140402 A1 | 6/2010 | Jakubec et al. | |
| 2010/0301163 A1* | 12/2010 | Guering et al. | 244/118.6 |
| 2011/0139930 A1* | 6/2011 | Sutthoff et al. | 244/118.5 |

FOREIGN PATENT DOCUMENTS

| | | |
|---|---|---|
| EP | 1364874 A1 | 11/2003 |
| WO | 2008104529 A2 | 9/2008 |

* cited by examiner

SMALL DIAMETER PRESSURE STRUCTURE COMMERCIAL AIRCRAFT CREW REST

CROSS-REFERENCES TO RELATED APPLICATIONS

This application is based upon and claims priority from U.S. Provisional Application No. 61/286,344, filed Dec. 14, 2009, which is incorporated by reference in its entirety.

BACKGROUND

This invention relates generally to resting and sleeping quarters for an aircraft crew, and more particularly concerns overhead aircraft crew resting and sleeping quarters in a space-saving and weight-saving configuration occupying substantially otherwise unused space aboard an aircraft.

Resting or sleeping facilities are commonly provided for the crew and passengers of ships, boats, trucks, buses, and the like when they are used for transportation of cargo or passengers over long distances. For example, one conventional arrangement for a two-deck trailer includes upper deck and lower deck sections, with the upper deck section including beds and stairs leading from one end of the lower deck to a central area of the upper deck. However, such facilities have been more uncommon for long distance airline flights, due to aircraft weight constraints and limitations of available space aboard aircraft. Bunks for crew members aboard ship, for example, are typically constructed of heavy metal frames bolted together to provide a heavy structure inappropriate for aircraft.

One known conventional aircraft crew rest facility includes configurations having 6 or 7 bunks. However, the crew rest facility is located in the lower lobe cargo bay of the aircraft, and occupies otherwise valuable cargo space, resulting in a loss of full freight capability for the aircraft. The weight of the crew rest facility is approximately 2,200 pounds, which further limits the capacity of the aircraft for carrying cargo or passengers.

Another known design for an aircraft overhead crew rest station includes bunk portions forward and aft of a central deck portion with left and right side bunk portions, and a central entry vestibule connected between the central deck portion and a passenger seating area below, and providing direct access to the central deck portion and bunk portions of the aircraft crew rest station.

Another conventional configuration for an aircraft overhead rest area includes an escape system in the crown of an aircraft above the ceiling in the main passenger cabin. A permanent access stairway is provided at one end of the overhead rest area, and an emergency escape includes a slide that can swing between a upward closed position and a downward open position.

It would be desirable to provide an improved configuration for a crew rest and sleeping station with bunk portions having a plurality of adjacent individual bunks or sleeping berths configured in interfitting alternating trapezoid shapes to optimize spatial accommodation of body proportions of crew members in available aircraft space in the overhead crown area of a commercial aircraft above a passenger cabin area, while still maintaining FAA bunk size and volume requirements. In order to further optimize entry space for crew member access to bunk portions provided, it would be desirable to provide common access to individual entrances to partitioned individual bunks or sleeping berths of the bunk portions provided from a central deck common area of the crew rest station, with a central entry vestibule connected between the central deck common area and a passenger seating area of the aircraft. It would also be desirable to provide an emergency escape hatch that exits into cabin aisleway, and a fold-down jump seat or auxiliary seat for optional seating during taxi, take-off and landing in the common deck area, typically adjacent to the emergency escape hatch. It would also be desirable to provide a combination fold-down entry door and floor cover in the stairwell or ladder area of a central vestibule to expand common area floor space, to provide increased capacity for crew members, occupying an area of the aircraft that is otherwise generally unused. It is also desirable to provide a crew rest and sleeping station that has a space-saving and weight-saving configuration that minimizes the reduction in capacity of the aircraft for carrying cargo or passengers. The present invention meets these and other needs.

SUMMARY OF THE INVENTION

Briefly, and in general terms, the present invention provides for an improved aircraft crew rest station that optimize spatial accommodation of crew members in available aircraft space in an overhead crown area of the aircraft. The aircraft typically includes a hull with a curved top portion, a lowered ceiling, and a space therebetween, and the overhead crew rest station is configured to occupy the space between the curved top portion of the hull of the aircraft and the lowered ceiling of the aircraft, with an entry vestibule providing access to the overhead crew rest station.

Accordingly, the present invention provides for a crew rest station for an aircraft having a hull with a curved top portion, a lowered ceiling overlying a passenger seating area, and a space therebetween. The crew rest station includes an overhead crew rest portion and a central entry vestibule connected between the passenger seating area and the overhead crew rest portion. The overhead crew rest portion includes a central deck portion disposed in the overhead crew rest portion, a forward bunk portion connected to a forward portion of said central deck portion and disposed in said overhead crew rest portion, and an aft bunk portion connected to an aft portion of the central deck module and disposed in the overhead crew rest portion. The central entry vestibule is connected between the passenger seating area and the central deck portion to provide direct access to the central deck portion of the overhead crew rest portion. The crew rest station is configured to occupy the space between the curved top portion of the hull of the aircraft and the lowered ceiling of the aircraft.

In a presently preferred aspect, the forward bunk portion includes a plurality of partitioned individual forward bunks or sleeping berths, and the aft bunk portion includes a plurality of partitioned individual aft bunks or sleeping berths. In another presently preferred aspect, the plurality of adjacent partitioned individual bunks or sleeping berths in the forward and aft bunk portions are configured in interfitting alternating trapezoid shapes to optimize spatial accommodation of body proportions of crew members in the available aircraft space in the overhead crown area of the aircraft above the passenger cabin area, while still maintaining FAA bunk size and volume requirements. In a presently preferred aspect, the forward bunk portion of the overhead crew rest portion includes three partitioned forward bunks, and the aft bunk portion of the overhead crew rest portion includes three partitioned aft bunks. In another presently preferred aspect, each of the forward and aft bunk portions extends from the central deck portion in a direction approximately parallel to the hull center line of the aircraft.

In another presently preferred aspect, the crew rest station includes an emergency escape hatch, and a fold-down jump seat typically adjacent to the emergency escape hatch. In another presently preferred aspect, the crew rest station includes a fold-down entry door that removably covers a stairwell or ladder area of the central vestibule, to expand the usable common area floor space of the crew rest station.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
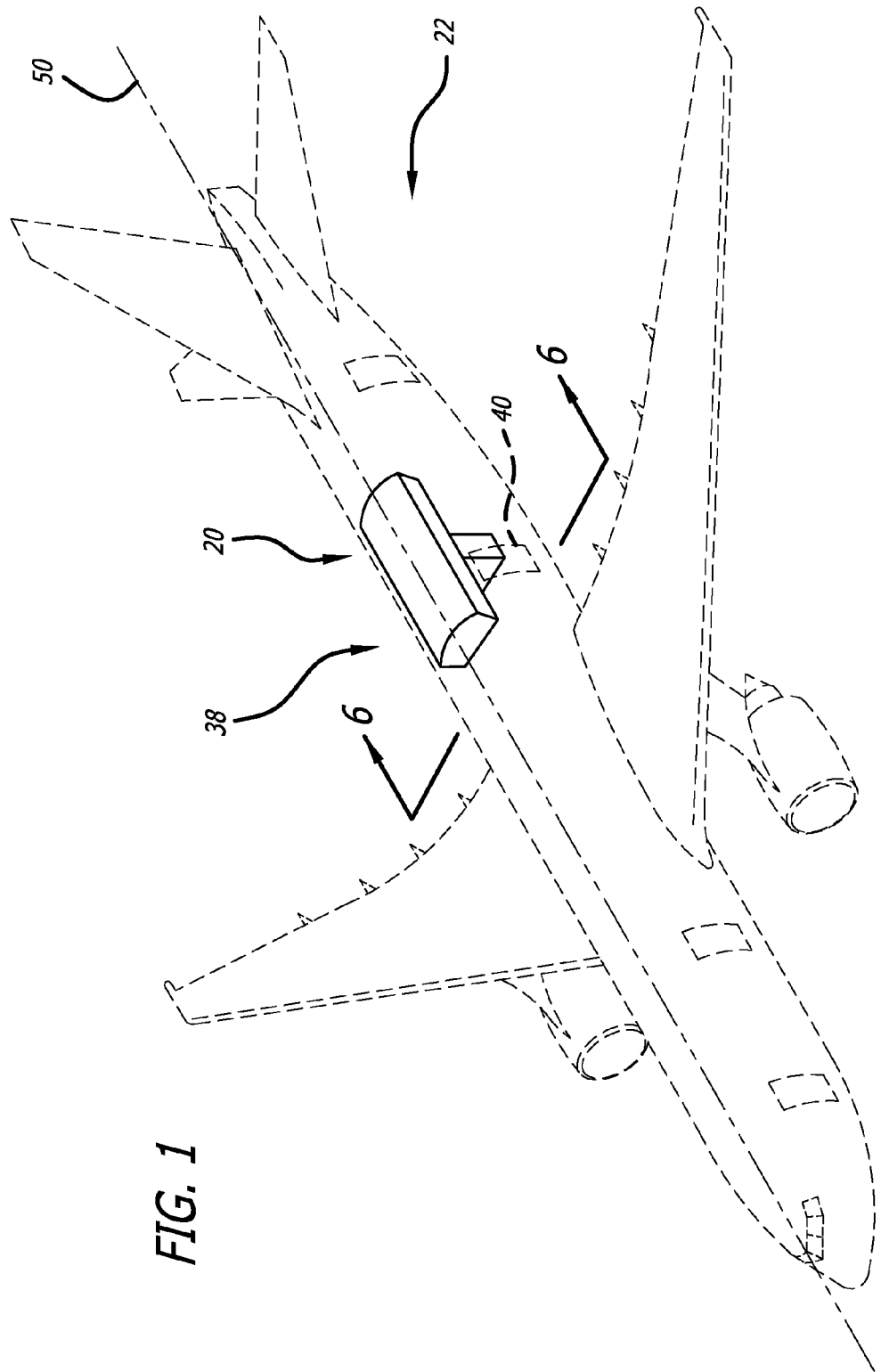
FIG. 1 is schematic diagram illustrating the configuration and position in an aircraft of the crew rest station according to the present invention.
Figure 2:
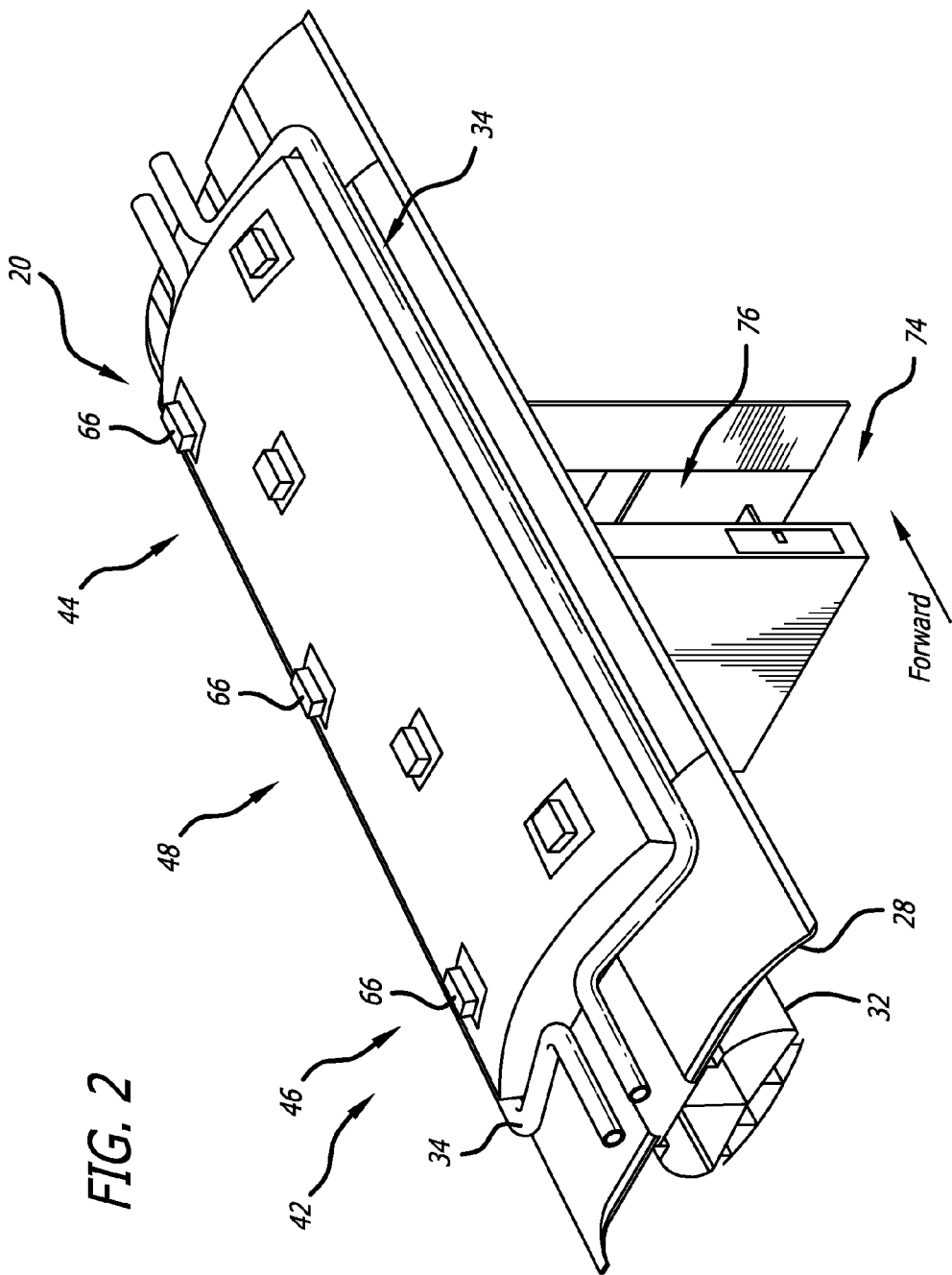
FIG. 2 is a perspective view illustrating the position of the crew rest station of FIG. 1 in an overhead crown area of a commercial aircraft above a passenger cabin area of the aircraft.
Figure 3:
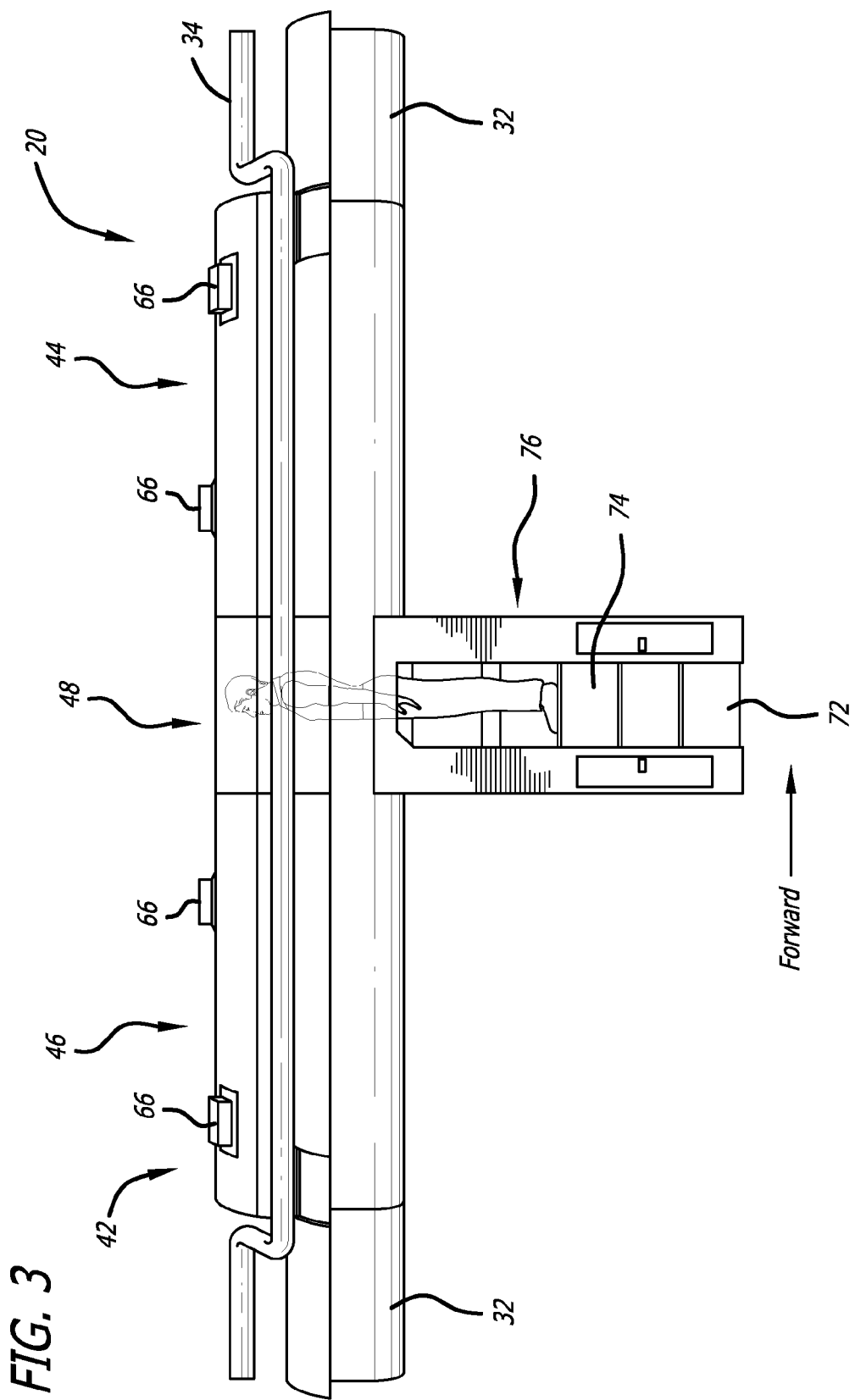
FIG. 3 is an elevational view illustrating the position of the crew rest station of FIG. 1 in an overhead crown area of a commercial aircraft above a passenger cabin area of the aircraft.
Figure 6:
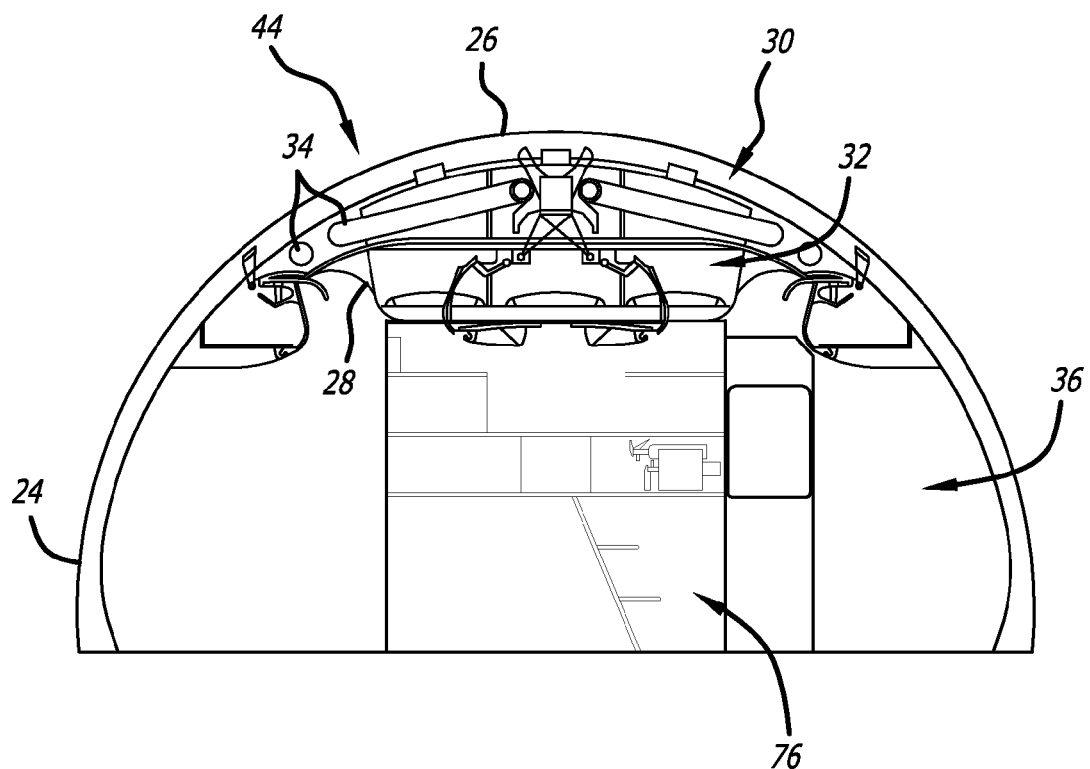
FIG. 6 is a sectional view of the crew rest station taken along line 6-6 of FIG. 1, illustrating pre-existing cabin stowage bin configurations before installation of the crew rest station according to the invention.
Figure 7:
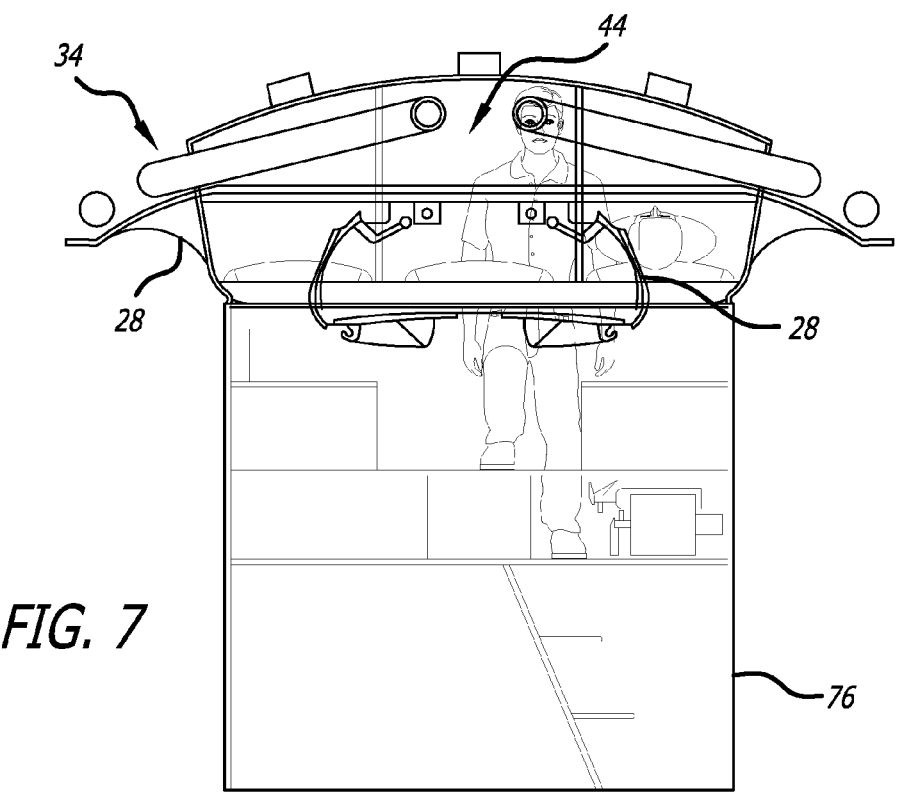
FIG. 7 is a sectional view of the crew rest station similar to that of FIG. 6, illustrating a pre-existing ceiling contour and a new ceiling contour, before and after installation of the crew rest station according to the invention.
Figure 8:
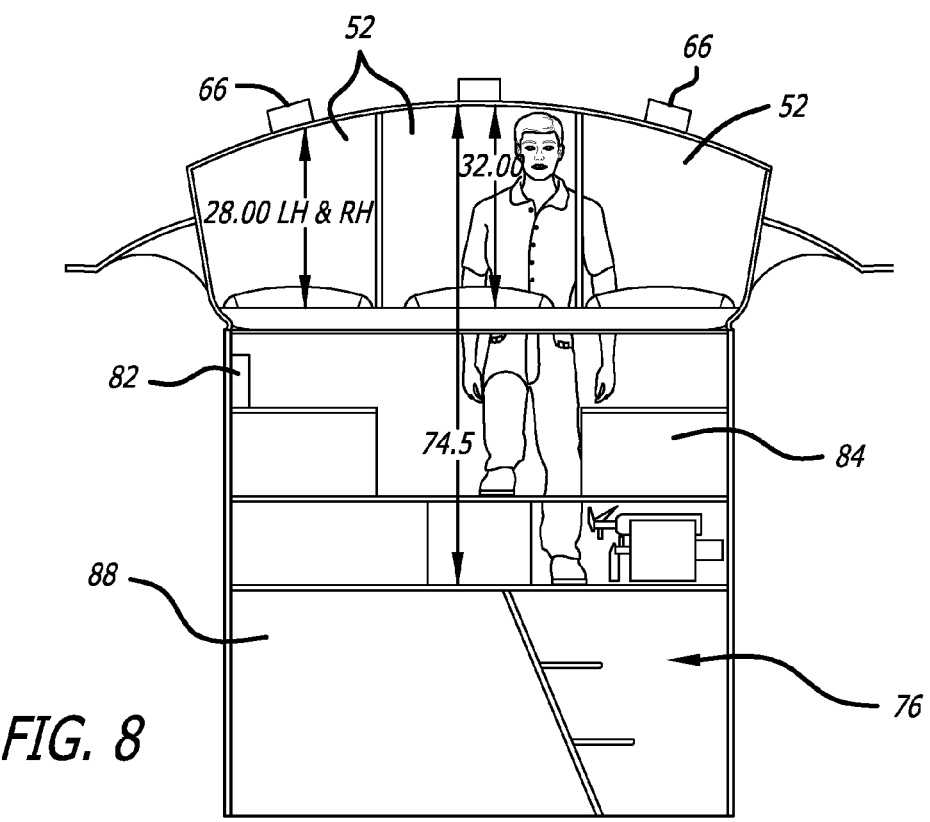
FIG. 8 is a sectional view of the crew rest station similar to FIG. 6, showing the forward bunk portion and central entry vestibule of the crew rest station according to the invention.
Figure 9:
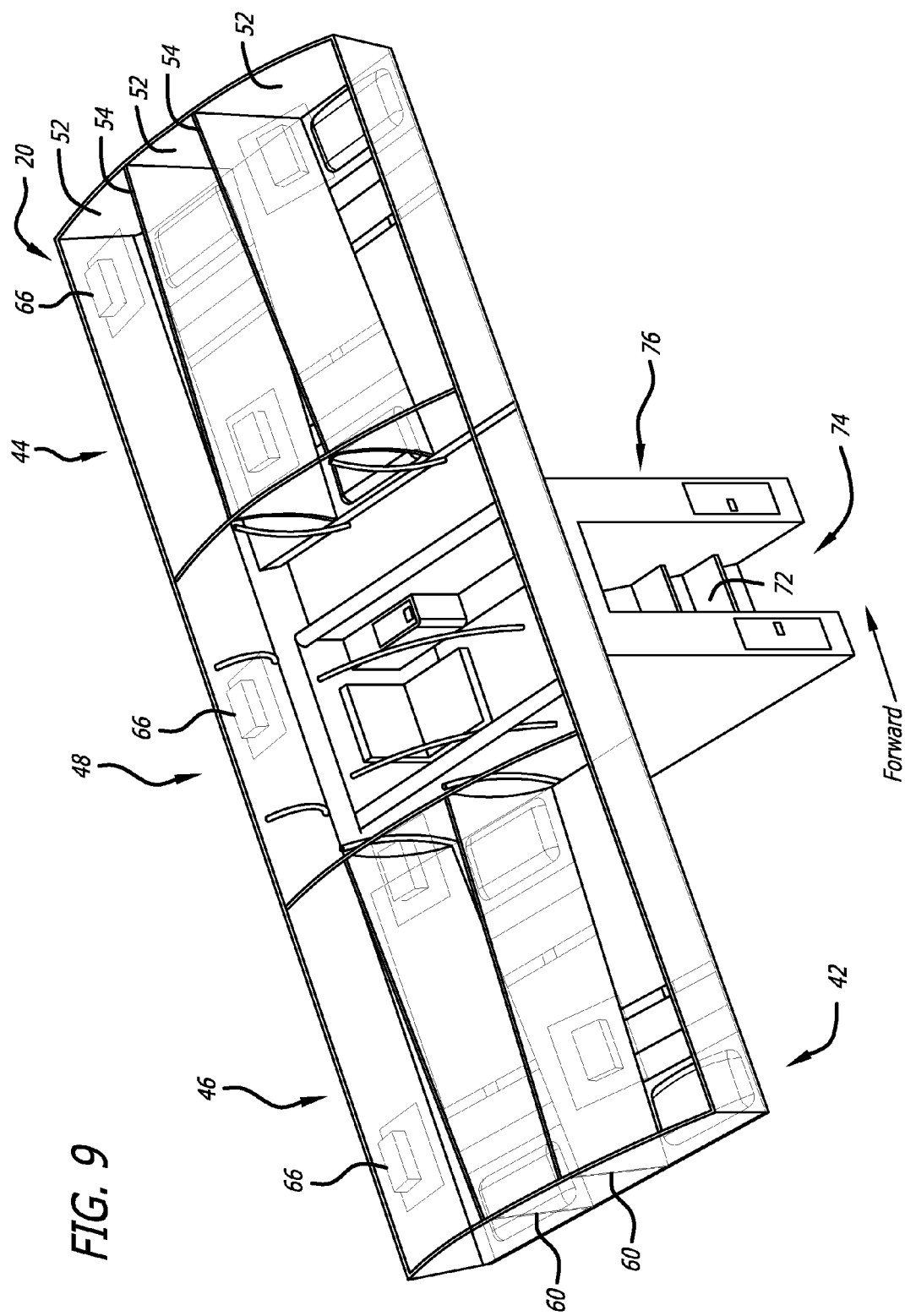
FIG. 9 is a top perspective view of the crew rest station illustrating the forward and aft bunk portions and central entry vestibule of the crew rest station according to the invention.

As is illustrated in the drawings, the invention is embodied in an improved aircraft crew rest station for an aircraft used for long distance flights. More particularly with reference to FIGS. 1 and 6, in a presently preferred embodiment, the present invention provides an improved crew rest station 20 for an aircraft 22, such as the Airbus A330/A340 for example, having a hull 24 with a curved top portion 26, a lowered ceiling 28, and a space 30 therebetween, typically provided for overhead stowage bins 32, and various types of ducting 34 above a passenger seating area 36. The aircraft crew rest station is typically located approximately in the aircraft midsection 38, adjacent door number three 40, and attached to the airframe of the aircraft.

Referring to FIGS. 2-5 and 11, the crew rest station includes an overhead crew rest portion 42 with a forward bunk portion 44, an aft bunk portion 46, and a central deck portion 48. Each of the forward and aft bunk portions extends from the central deck portion, preferably in a direction approximately parallel to a hull center line 50 of the aircraft. The forward bunk portion preferably includes a plurality of individual forward bunks or sleeping berths 52, preferably separated by partitions 54, and each having individual entrances 56. The aft bunk portion similarly includes a plurality of individual aft bunks or sleeping berths 58, preferably separated by partitions 60, and each having an individual entrance or entry 62. Each of the entrances to the individual bunks or sleeping berths preferably can be curtained with moveable curtains 64 to provide individual privacy and darkness for each individual bunk or sleeping berth. Each of the individual forward and aft bunks or sleeping berths also preferably includes individual overhead passenger service units (PSU) 66, which typically provide lighting, ventilation or air supply, call buttons, and the like. A passenger service unit is also typically provided in the overhead area of the central deck portion. Accommodations for all bunk positions or sleeping berths typically include an emergency oxygen mask, a reading light, an air flow nozzle, also commonly known in the industry as a gasper, a main distribution vent air, personal stowage, the privacy curtain, and a mattress.

The central deck portion provides a common entry and changing area, preferably located approximately midway between the forward and aft bunk portions, providing common access to the individual entrances to the partitioned individual forward and aft bunks or sleeping berths of the bunk portions. Typically the maximum head height in the central deck common changing area is approximately 72 inches, and each of the individual bunks or sleeping berths are typically approximately 80 inches long, and provide a space of approximately 30 inches high from the top of a mattress in the bunks or sleeping berth to the ceiling crown. The forward bunk portion, aft bunk portion and the central deck portion are typically configured to be located against the curved top portion of the hull of the aircraft to fit in the space between the hull and the lowered ceiling of the aircraft. In a presently preferred embodiment, the forward bunk portion of the overhead crew rest portion includes three partitioned forward bunks, and the aft bunk portion of the overhead crew rest portion includes three partitioned aft bunks, providing six bunk or sleeping berth arrangements for each aircraft crew rest station.

Figure 4:
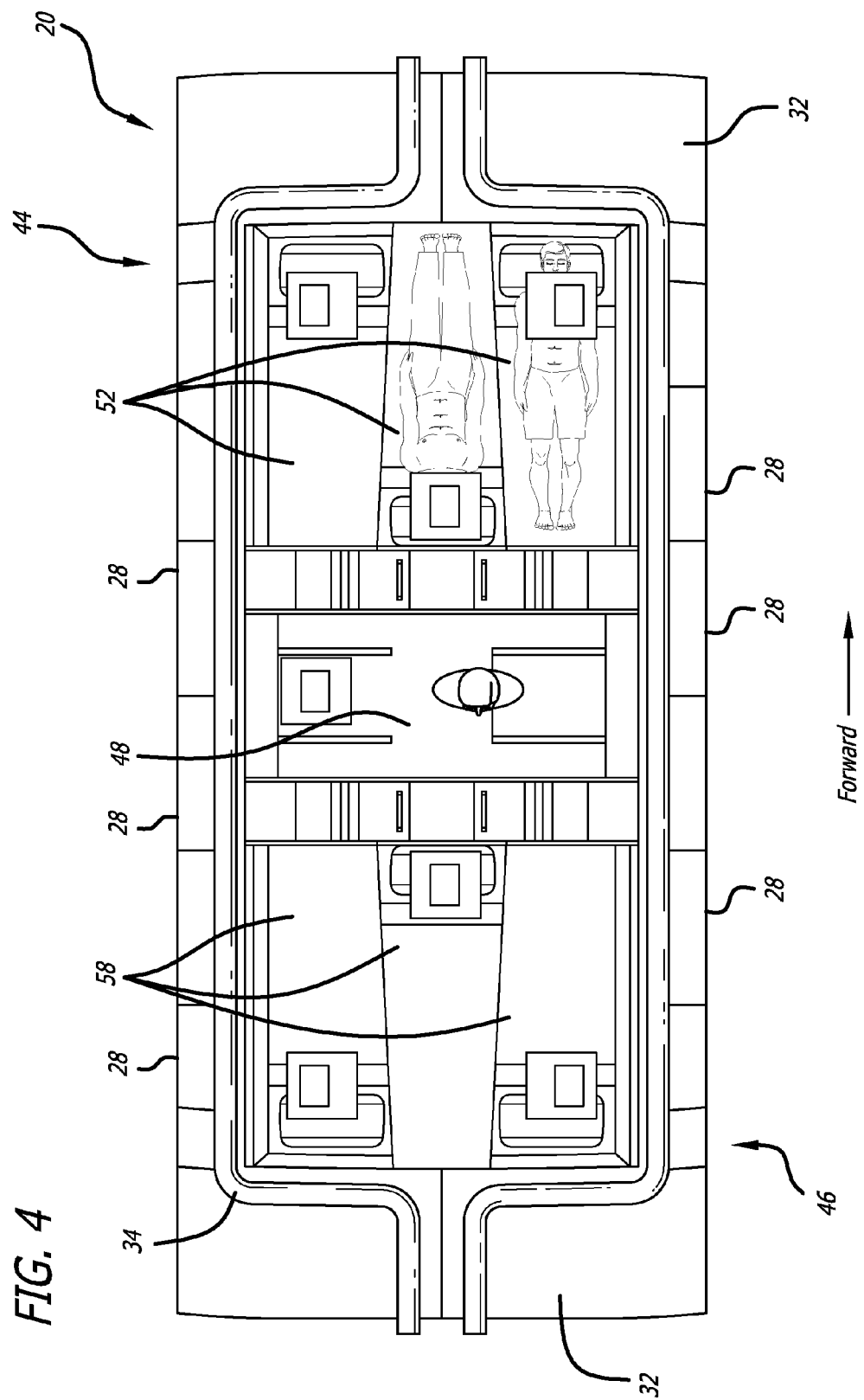
FIG. 4 is a top plan view illustrating the position of the crew rest station of FIG. 1 in an overhead crown area of a commercial aircraft above a passenger cabin area of the aircraft.
Figure 5:
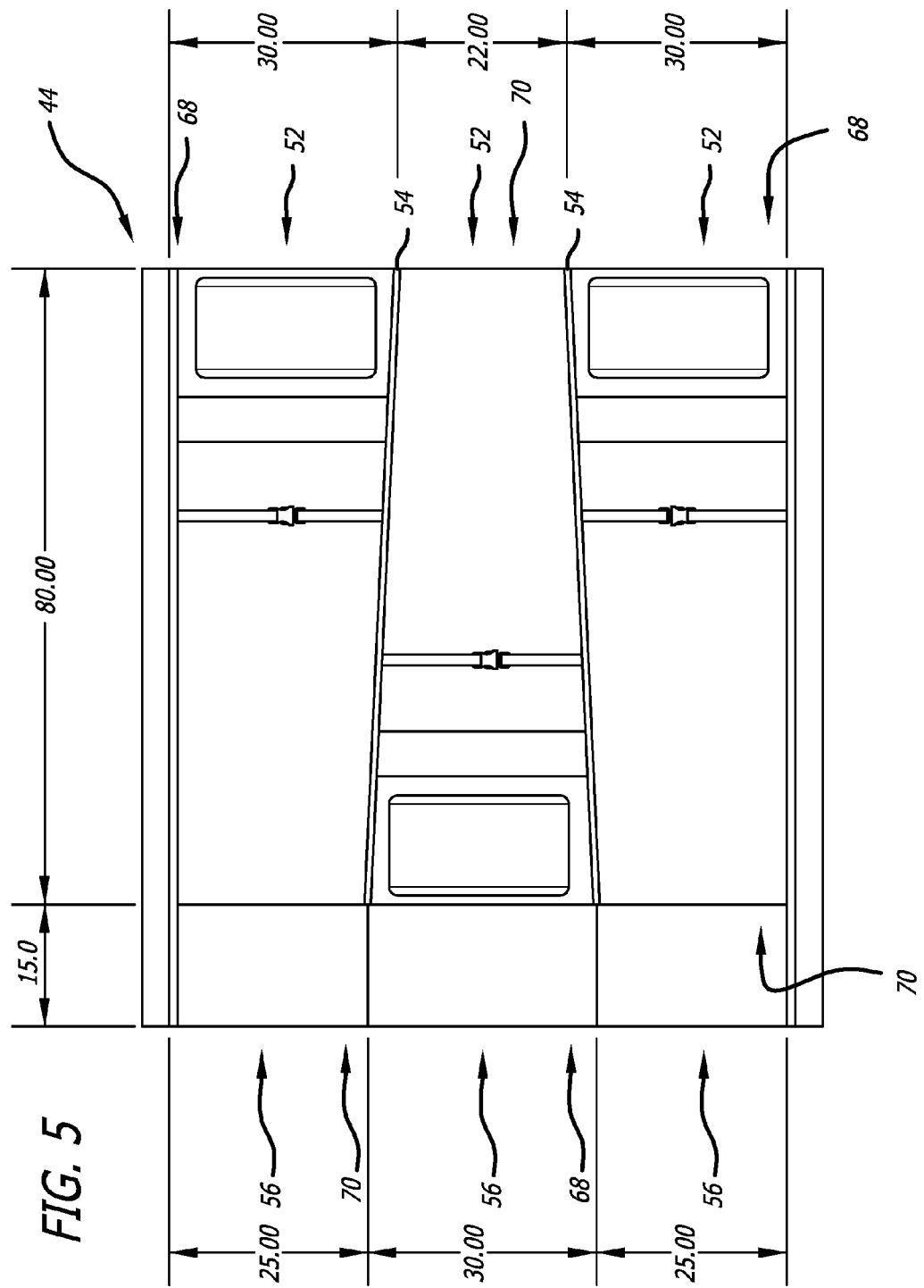
FIG. 5 is a top plan view of the forward bunk portion of the crew rest station of FIG. 1, of which the view of the aft bunk portion is substantially a mirror image.
Figure 10:
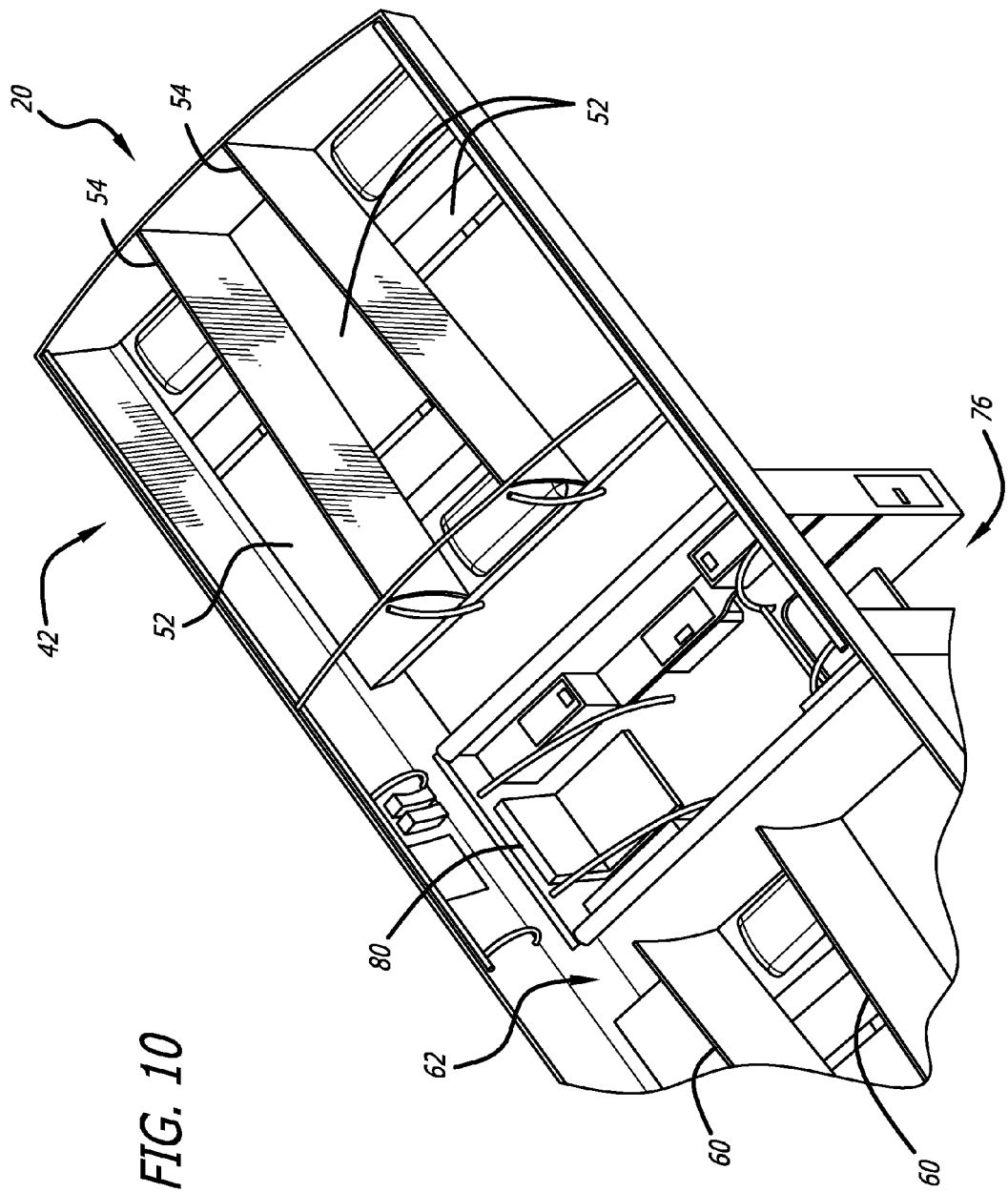
FIG. 10 is an enlarged top perspective view of the crew rest station similar to that of FIG. 9, illustrating the forward and aft bunk portions and central entry vestibule of the crew rest station according to the invention in detail.
Figure 11:
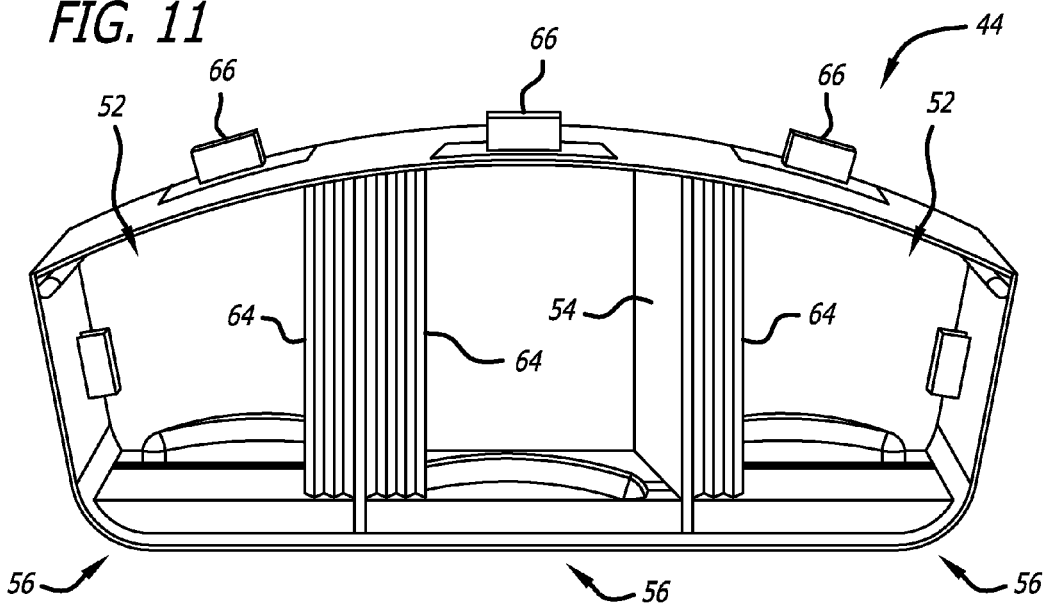
FIG. 11 is an elevational view from the center deck portion into the forward bunk portion, of which the view into the aft bunk portion is substantially a mirror image.
Figure 12:
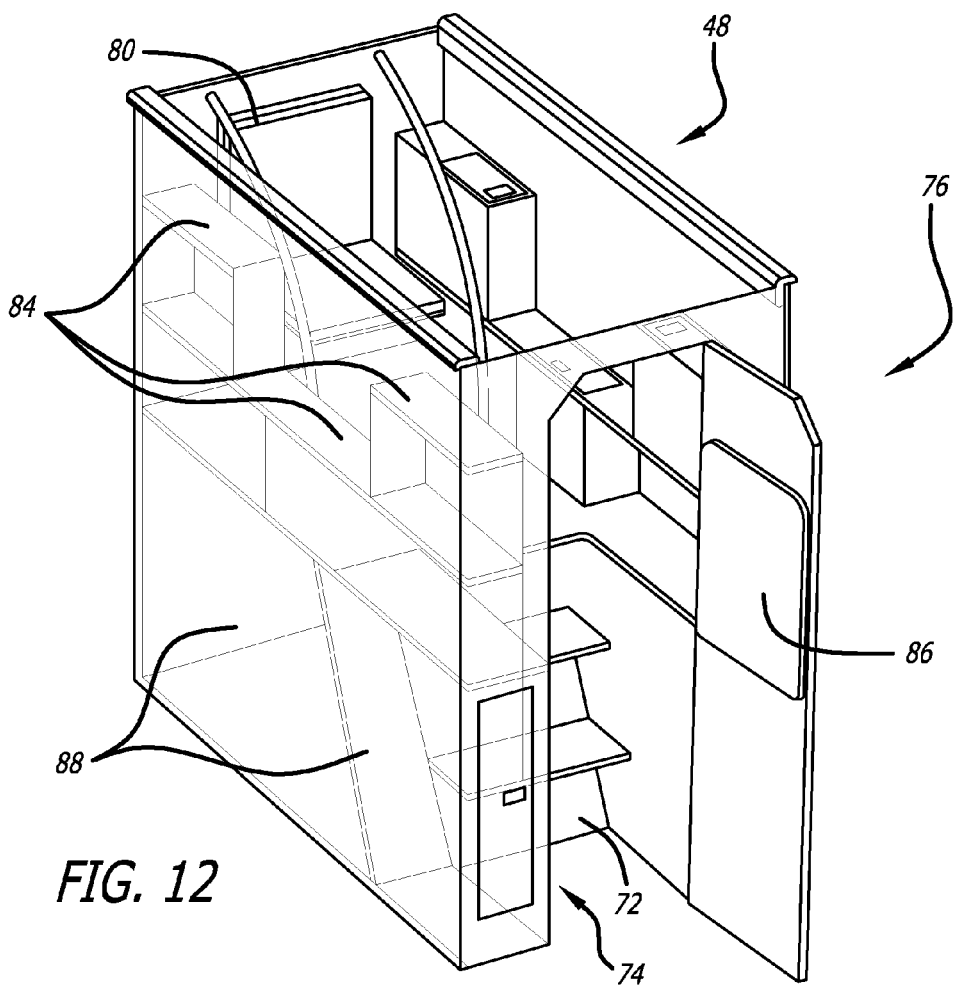
FIG. 12 is a schematic top perspective view of the central entry vestibule of the crew rest station according to the invention.
Figure 13:
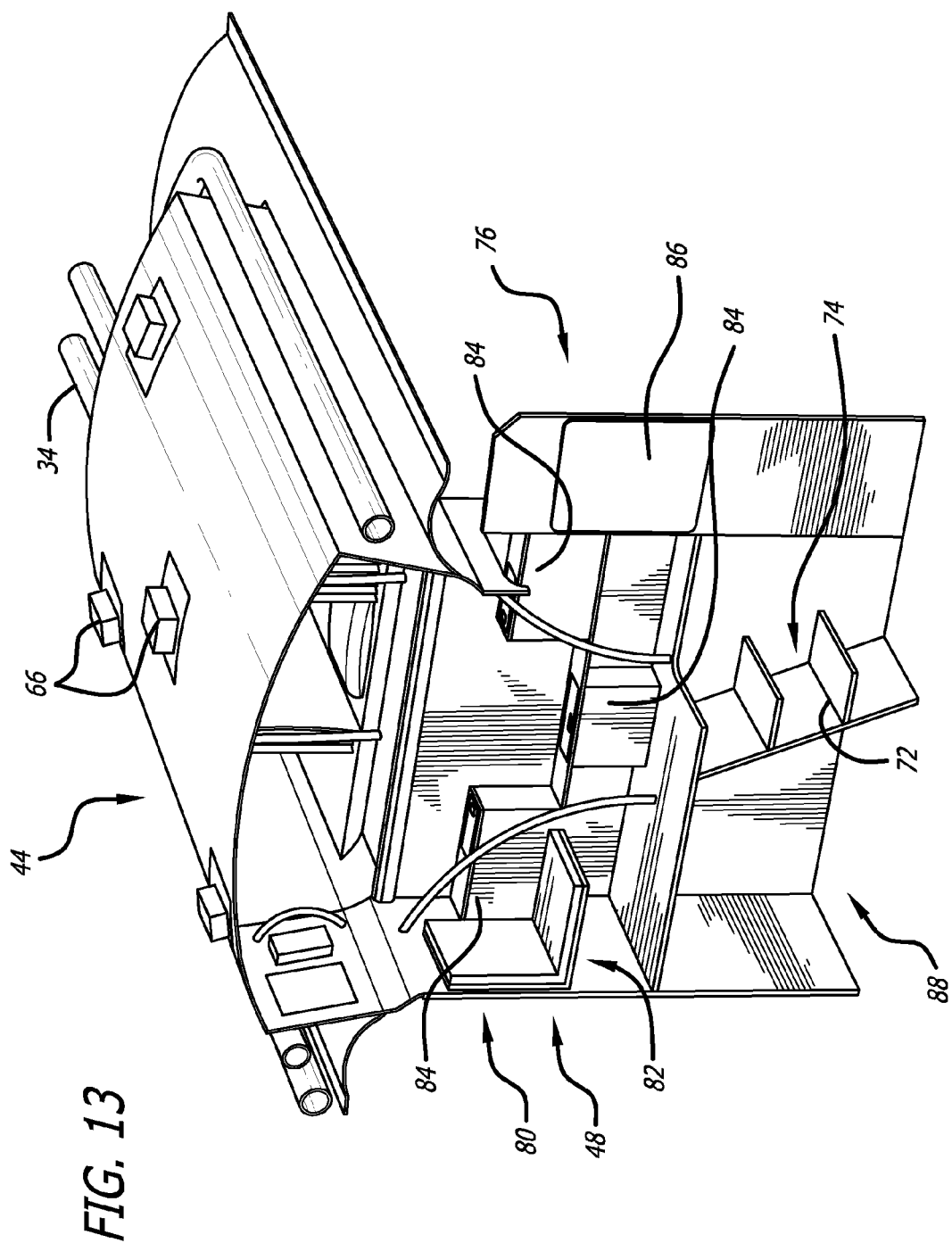
FIG. 13 is a sectional perspective view of the crew rest station taken along line 8-8 of FIG. 1 showing the central entry vestibule and central deck portion of the crew rest station according to the invention.

In another presently preferred aspect, as is illustrated in FIGS. 4, 5 and 10, the plurality of adjacent partitioned individual bunks or sleeping berths in the forward and aft bunk portions are configured in interfitting alternating trapezoid shapes, having a head end 68 that is wider than a foot end 70 of the individual bunks or sleeping berths, to optimize spatial accommodation of body proportions of crew members in the available aircraft space in the overhead crown area of the aircraft above the passenger cabin area, while still maintaining FAA bunk size and volume requirements. The head ends of the trapezoid shaped bunks or sleeping berths are typically approximately 30 inches wide, and the foot ends of the trapezoid shaped bunks or sleeping berths are typically approximately 25 inches wide, for example.

Referring to FIGS. 2, 3, 9, 12 and 13, access to the crew rest station from the passenger seating area is preferably provided by an entry stairs or ladder 72 extending up through an entry stairway or ladder area 74 provided in a generally centrally located entry vestibule 76, connected between the passenger seating area and the central deck portion of the crew rest station, and providing direct access to the central deck portion of said overhead crew rest portion. This results in very low intrusion into normally otherwise occupied space such as the cargo bay and the main deck seating area. The crew rest station preferably includes sufficient space to provide all the amenities and emergency equipment that would be necessary to satisfy the flight regulations.

The overhead crew rest portion is typically formed of a lightweight composite material, such as fiberglass, for example, and can be molded as a single unit for increased strength, so that the unit does not need to be bolted together. Alternatively, the overhead crew rest portion can be formed of modular sections, with the forward bunk portion being formed of a forward modular section, and the aft bunk portion being formed of an aft modular section, which can be connected together with a central deck module, all preferably formed of molded composite material, such as fiberglass. It should be recognized that a crew rest station of a larger or smaller capacity could also be provided by simply increasing or reducing the number of bunks or sleeping berths, and that a flight crew rest station could be provided at other locations in the aircraft as well, such as a forward flight crew rest station with two bunks or sleeping berths, for example. The typical hoop frame of the aircraft supports and allows for sufficient space for the overhead crew rest portion in otherwise unused space of the aircraft. Modification of an existing aircraft configuration for installation of the aircraft crew rest station of the invention involves creation of a new ceiling contour, and the loss of a maximum of eight passenger area stowage bins. The overhead crew rest portion located between the hull and lowered ceiling of the aircraft thus does not impinge upon the passenger seating area or the cargo area of the aircraft.

Referring to FIGS. 8, 9, 10, 12 and 13, the center deck portion of the overhead crew rest portion also preferably includes an emergency escape hatch 80 that exits into cabin aisleway, a fold-down or folding jump seat 82 typically adjacent to the emergency escape hatch, and a stowage cabinet 84. The crew rest station also includes a fold-down entry door 86 that removably covers the entry stairway or ladder area of the central vestibule, to expand the usable common area floor space of the crew rest station. The vestibule also economically provides additional stowage space 88. Accommodations for the central entry vestibule and the common area and changing area of the central deck portion include personal stowage provisions for cabin crew, fold down seat, smoke detection, emergency lighting, emergency equipment, cabin interphone, temperature and lighting information indicators and control panel, seating and stowage, an emergency escape hatch, and stowage with cabin access.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An aircraft crew rest station for an aircraft having a hull with a curved top portion, a lowered ceiling overlying a passenger seating area, and a space therebetween overlying a passenger seating area below the lowered ceiling, the aircraft crew rest station comprising:

an overhead crew rest portion contoured to occupy the space between the curved top portion of the hull of the aircraft and the lowered ceiling of the aircraft, said overhead crew rest portion including a central deck portion disposed in the overhead crew rest portion, a forward bunk portion connected to a forward portion of said central deck portion and disposed in said overhead crew rest portion, and an aft bunk portion connected to an aft portion of the central deck portion and disposed in the overhead crew rest portion, said forward bunk portion including a plurality of adjacent partitioned individual forward sleeping berths and said aft bunk portion including a plurality of adjacent partitioned individual aft sleeping berths, each of said plurality of adjacent partitioned individual sleeping berths in the forward and aft bunk portions having a head end and a foot end, said head end being wider than said foot end, and said berths in said forward and aft bunk portions being configured in interfitting adjacent alternating trapezoid shapes with a head end of at least one of said plurality of adjacent partitioned individual sleeping berths being positioned adjacent to a foot end of at least one other of said plurality of adjacent partitioned individual sleeping berths to optimize spatial accommodation of body proportions of crew members in the forward and aft bunk portions in the overhead crew rest portion; and a central entry vestibule connected between the aircraft passenger seating area and the central deck portion of the overhead crew rest portion to provide direct access to the central deck portion of the overhead crew rest portion, each of said plurality of adjacent partitioned individual sleeping berths in said forward and aft bunk portions having individual entrances connected to said central deck portion at alternating adjacent head and foot ends of said plurality of adjacent partitioned sleeping berths of said forward and aft bunk portions.

2. The aircraft crew rest station of claim 1, wherein said forward bunk portion includes three partitioned forward bunks, and said aft bunk portion includes three partitioned aft bunks.

3. The aircraft crew rest station of claim 1, wherein each of said forward and aft bunk portions extends from said central deck portion in a direction approximately parallel to a hull center line of the aircraft.

4. The aircraft crew rest station of claim 1, wherein said central entry vestibule includes a ladder area, and the central deck portion includes a fold-down entry door that removably covers the ladder area of the central vestibule, to expand the usable common area floor space of the crew rest station.

5. The aircraft crew rest station of claim 1, wherein said central entry vestibule includes a fold-down jump seat.

6. In an aircraft crew rest station of an aircraft having a hull with a curved top portion, a lowered ceiling overlying a passenger seating area, and a space therebetween overlying a passenger seating area below the lowered ceiling, the aircraft crew rest station including an overhead crew rest portion contoured to occupy the space between the curved top portion of the hull of the aircraft and the lowered ceiling of the aircraft, said space overlying a passenger seating area within the hull of the aircraft, a central deck portion disposed in the overhead crew rest portion, a forward bunk portion connected to a forward portion of said central deck portion and disposed in said overhead crew rest portion, and an aft bunk portion connected to an aft portion of the central deck portion and disposed in the overhead crew rest portion, said forward bunk portion including a plurality of adjacent partitioned individual forward sleeping berths and said aft bunk portion including a plurality of adjacent partitioned individual aft sleeping berths, each of said plurality of adjacent partitioned individual sleeping berths in the forward and aft bunk portions having a head end and a foot end, said head end being wider than said foot end, and a central entry vestibule connected between the aircraft passenger seating area and the central deck portion of the overhead crew rest portion to provide direct access to the central deck portion of the overhead crew rest portion, wherein the improvement in the aircraft crew rest station comprises:

said plurality of adjacent partitioned individual sleeping berths in the forward and aft bunk portions being configured in interfitting alternating trapezoid shapes with a head end of at least one of said plurality of adjacent partitioned individual sleeping berths being positioned adjacent to a foot end of at least one other of said plurality of adjacent partitioned individual sleeping berths to optimize spatial accommodation of body proportions of crew members in the forward and aft bunk portions in the overhead crew rest portion; and each of said plurality of adjacent partitioned individual sleeping berths in said forward and aft bunk portions having individual entrances connected to said central deck portion at alternating adjacent head and foot ends of said plurality of adjacent partitioned sleeping berths of said forward and aft bunk portions.

7. The aircraft crew rest station of claim 6, wherein said forward bunk portion includes three partitioned forward bunks, and said aft bunk portion includes three partitioned aft bunks.

8. The aircraft crew rest station of claim 6, wherein each of said forward and aft bunk portions extends from said central deck portion in a direction approximately parallel to a hull center line of the aircraft.

9. The aircraft crew rest station of claim 6, wherein said central entry vestibule includes a ladder area, and the central deck portion includes a fold-down entry door that removably covers the ladder area of the central vestibule, to expand the usable common area floor space of the crew rest station.

10. The aircraft crew rest station of claim 6, wherein said central entry vestibule includes a fold-down jump seat.

* * * * *